UNITED STATES PATENT OFFICE.

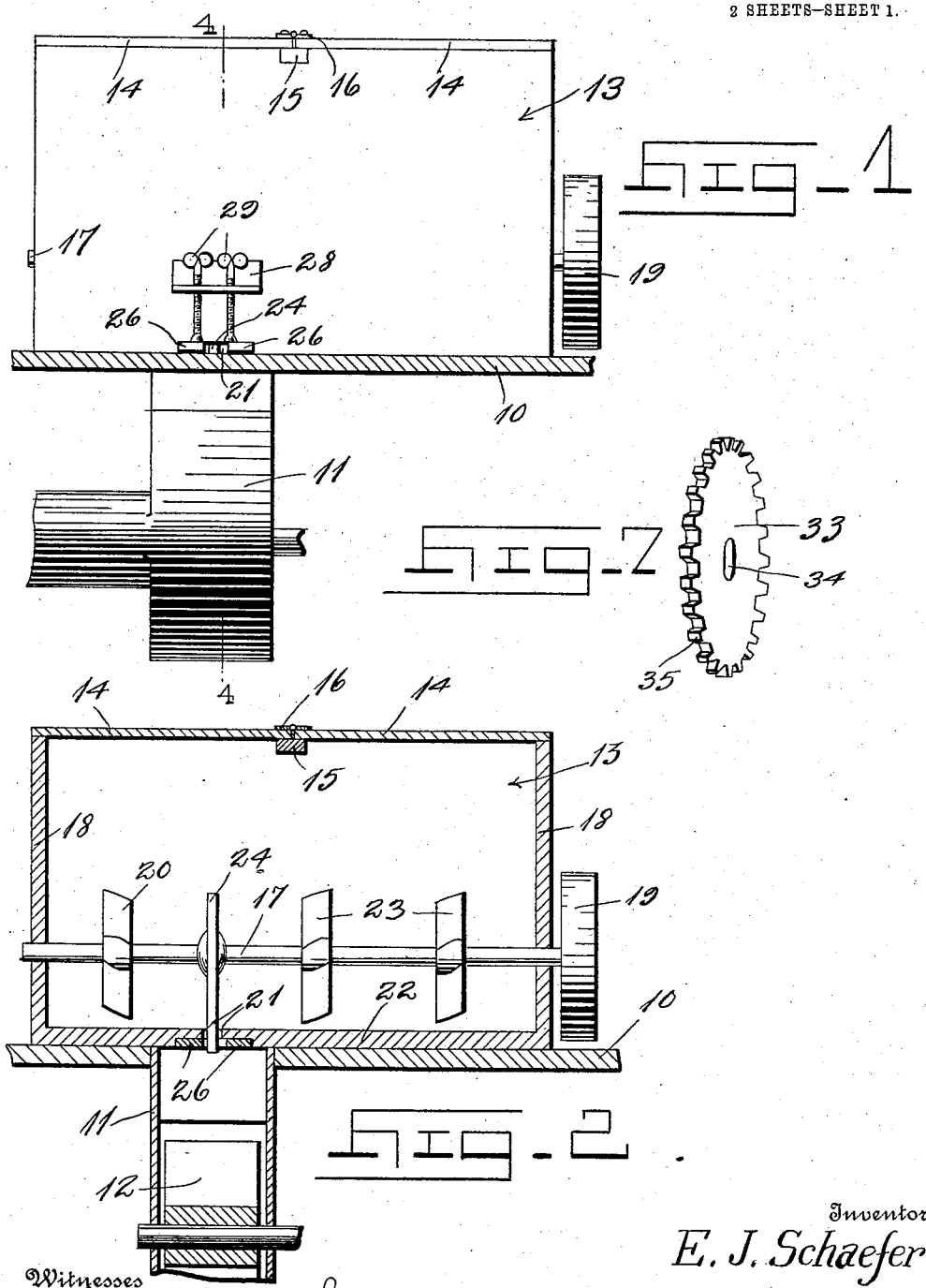

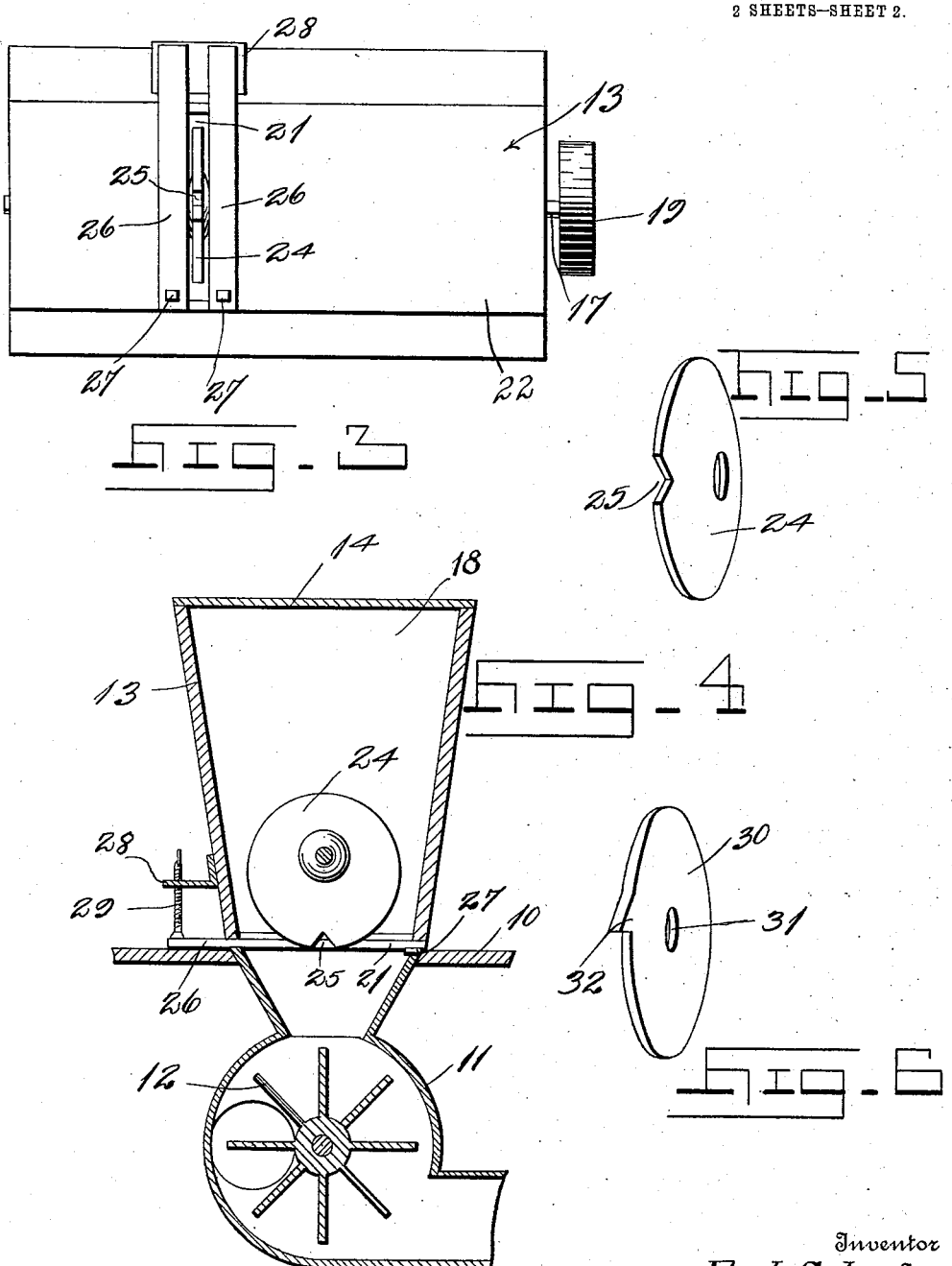

EDWARD J. SCHAEFER, OF GERMAN TOWNSHIP, HANCOCK COUNTY, IOWA.

SHREDDED-CORN-FODDER SALTER.

1,033,199.      Specification of Letters Patent.      Patented July 23, 1912.

Application filed February 27, 1912. Serial No. 680,143.

*To all whom it may concern:*

Be it known that I, EDWARD J. SCHAEFER, a citizen of the United States, residing in German township, in the county of Hancock and State of Iowa, have invented certain new and useful Improvements in Shredded-Corn-Fodder Salters, of which the following is a specification.

This invention relates to a device for salting shredded corn fodder or the like and the primary object of the invention is to provide a simple and cheap article of this character which may be conveniently supported upon a shredder or threshing machine to feed the salt to the blower, whereby the salt will drop into the blower with the shredded corn stalks before the latter enter the fan so as to thoroughly mix the salt and fodder.

Another object of the invention is to provide a salting machine or device in the form of a box adapted to receive the salt therein, the box being provided with means for feeding the salt toward a discharge opening in the bottom of the box and also provided with novel means for regulating the amount of salt discharged.

With these and other objects in view, the invention consists of certain other combinations and arrangements of parts as will be hereinafter more fully described and claimed, it being a still further object of the invention to provide a device which will not be likely to get out of working order.

In the drawings:—Figure 1 is a front elevation of my improved salting machine mounted upon a shredder of well known structure, the top of the shredder and casing of the blower being shown. Fig. 2 is a vertical longitudinal sectional view of the device shown in Fig. 1. Fig. 3 is a bottom plan view of the salting machine detached from the shredder or threshing machine. Fig. 4 is a transverse sectional view taken on the line 4—4 of Fig. 1. Fig. 5 is a detail perspective view of the feeding disk employed. Fig. 6 is a perspective view of a modified form of feed disk. Fig. 7 is a similar view of a further modified form of feed disk.

Referring to the drawings in detail, there is shown a portion of a shredder or threshing machine having a top portion 10 and provided with the usual blower casing 11 in which a fan blower 12 is mounted for rotation, my improved salting machine being mounted thereon and adapted for operation in connection with wet, dry, frozen or lumpy salt for thoroughly salting the shredded fodder.

My improved salter comprises a rectangular box structure 13 preferably provided with a pair of hinge covers 14 mounted upon a central transverse cross member 15 by hinges or the like 16 whereby the salt may be conveniently fed into the box. A shaft 17 extends longitudinally through the box and is rotatably journaled in the ends 18 thereof, said shaft carrying on one end outwardly of the box a belt wheel or pulley 19 of suitable diameter and which is adapted to be driven from any part of the machinery of the shredder or threshing machine at a high velocity, preferably one-hundred and fifty (150) revolutions a minute. Mounted upon the shaft 17 are a plurality of paddles, the paddle 20 being mounted upon one side of a feed slot 21 in the bottom 22 of the box and the paddles 23 being mounted upon the opposite side of the slot and all of said paddles operating to feed the salt toward the slot.

In order to distribute the salt or discharge the same from the box, a feed disk 24 is eccentrically mounted on the shaft 17 and is provided with a peripheral notch 25 in which the salt feeds and it will be observed that said notch is located at the point farthest removed from the shaft thereby forming a forced feed during the rotation of the disk. The disk 24 operates within the slot 21 to discharge the salt above the blower so that it will be thoroughly mixed with the fodder and in order to regulate the amount of salt discharged by the feed wheel so that the same will be maintained uniform at all times during a certain regulated position, I provide a pair of bars or sections of metal 26 of suitable width, the same being pivoted at common ends as shown at 29 to the bottom of the box adjacent one side thereof and upon opposite sides of the slot 21 and having their opposite ends projecting beyond the opposite side of the box. An angular bracket 28 is mounted upon the last mentioned side of the box in a horizontal position above the extended ends of the members 26 and has a pair of thumb screws 29 operating therethrough and connected to the bars or sections 26 to adjust the same with respect to each other and within the slot or recess 21.

I wish to have it understood that I may make such changes in the construction of the device as fairly fall within the scope of the appended claims, it being further understood that the device under the statutes is protected for all desirable uses to which it may be put without departing from the spirit of the invention.

I claim:—

1. In a salt distributer, a box structure, a shaft rotatably mounted therein, said box structure having a discharge opening intermediate its ends, a plurality of paddles carried by the shaft at opposite sides of the opening to feed the salt toward the opening, a disk rotatable with the shaft and operating through the opening for distributing the salt therethrough, a pair of plates pivoted to the bottom of the box structure and operating beneath the opening, the free ends of the plates extending beyond one side of the box and clamping screws carried by said side to engage frictionally with the plates and hold the same in adjusted positions relative to the opening.

2. In a salting machine for corn fodder, the combination with a blower casing and a blower operable therein for discharging the shredded material therefrom; of a receptacle mounted upon the shredder and provided with a closure and a recessed discharge slot communicating with the casing, a shaft journaled in the receptacle, means for rotating the shaft, paddles carried by the shaft for feeding the materials to the slot, a feed disk eccentrically mounted on the shaft and within the slot and means arranged on opposite sides of the disk to regulate the amount of material discharged.

In testimony whereof I affix my signature, in the presence of two witnesses.

EDWARD J. SCHAEFER.

Witnesses:
 A. G. KOERNER,
 C. F. BIER.

Copies of this patent may be obtained for five cents each, by addressing the "Commissioner of Patents, Washington, D. C."